W. S. HYDE.
Cultivator.
No. 9,798.
Patented June 21, 1853.
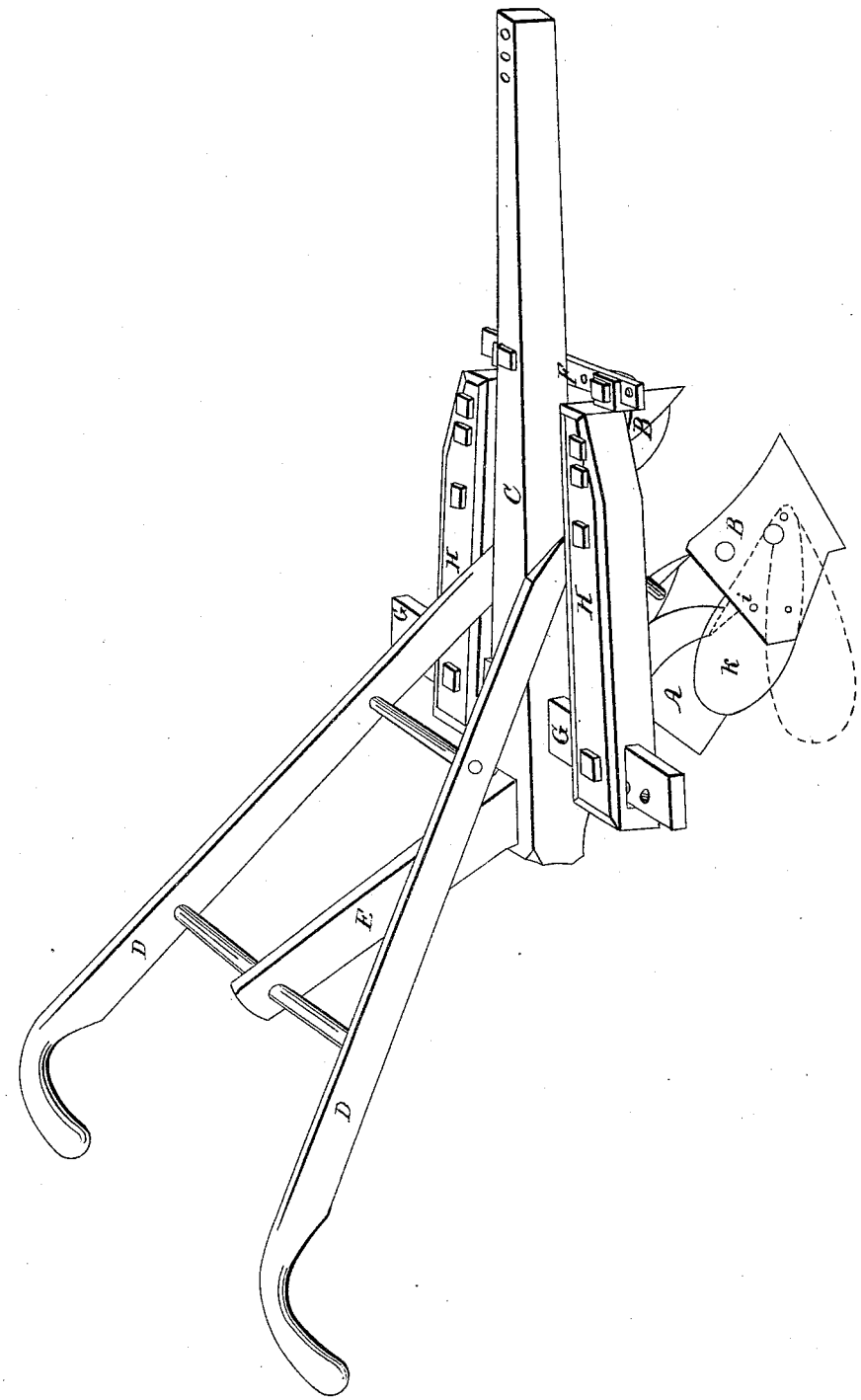

UNITED STATES PATENT OFFICE.

W. S. HYDE, OF TOWNSEND, OHIO.

IMPROVEMENT IN CULTIVATOR-PLOWS.

Specification forming part of Letters Patent No. 9,798, dated June 21, 1853.

*To all whom it may concern:*

Be it known that I, W. S. HYDE, of Townsend, in the county of Huron and State of Ohio, have invented a new and useful Improvement in Cultivators, of which the following is a full, clear, and exact description, reference being had to the accompanying drawing, which forms part of this specification, and which represents a view in perspective of my improved corn-cultivator.

My cultivator, as represented in the accompanying drawing, is composed of three shares, A B B, secured to an adjustable frame. The latter is composed of a stock or beam, C, to the front extremity of which the horse is hitched, and to whose hinder extremity the middle share, A, is secured. This beam is also fitted with a pair of handles, D D, which project behind the frame, and by which the cultivator is directed. In order to stiffen the machine, these handles are connected by a cross-bar with the upper end of the standard E, to whose lower extremity the middle share is secured. Two cross-bars, F G, are secured to the beam C. These sustain short beams H H, to which the side shares are secured. These short beams are hinged to the front cross-bar, F, of the main beam in such manner that their hinder extremities can be turned toward or from the main beam to vary the angle at which the side shares act. Their hinder extremities are perforated to pass over the hinder cross-bar, G, which is perforated with a series of holes, through any one of which a bolt, *a*, can be passed to secure the hinder extremity of the side beam in any desired position. The front cross-bar is also perforated with a series of holes, to which the bolts which secure the front extremities of the side beams to this cross-bar can be shifted to secure these extremities at any desired distance from the main beam.

The middle share, A, is of the shovel variety, sloping backward in each direction from a central line. The side shares, B, are of the plow variety, and are inclined in opposite directions to throw the soil in opposite directions from the center of the machine. These side shares are each fitted with an adjustable wing, *k*, which is pivoted to the mold-board, and can be turned up or down, as represented in continuous and dotted lines in the accompanying drawing. It can also be secured in any desired position by means of a bolt, *i*. When this wing is turned down its lower edge is some distance above the lower edge of the mold-board, and hence the latter may be set to cut considerably deeper than the former, and while the latter is cutting below the level of the roots the former may be set to pulverize the soil above the roots and to throw it against the stalks. This device therefore enables me, at one passage of the cultivator, to cultivate the ground superficially on the ridges near the stalks of the plant and deeply and thoroughly between the ridges, where there is no danger of injuring the roots of the plants. The adjustability of the supplementary mold-board also permits the user to vary its position to suit the exigencies of any particular case.

What I claim as my invention, and desire to secure by Letters Patent, is—

The cultivator herein described, with adjustable supplementary wings, so constructed as to cultivate the soil superficially near the roots of the plants and deeper at a distance therefrom, the wings being adjustable to any required angle with the bottom of the furrow, so as to give any desired degree of inclination to the sides of the ridges or hills, and to change their inclination from time to time to adapt them to the varying stages of the growth of the plant, the whole being constructed and operating as described.

In testimony whereof I have hereunto subscribed my name.

WM. S. HYDE.

Witnesses:
M. R. BRAILEY,
JAS. M. FOWLER.